(12) United States Patent
Otake et al.

(10) Patent No.: US 12,142,768 B2
(45) Date of Patent: Nov. 12, 2024

(54) METHOD FOR PRODUCING GAS DIFFUSION ELECTRODE SUBSTRATE

(71) Applicant: TORAY INDUSTRIES, INC., Tokyo (JP)

(72) Inventors: Hiroaki Otake, Otsu (JP); Masamichi Utsunomiya, Otsu (JP); Fumitaka Watanabe, Otsu (JP)

(73) Assignee: TORAY INDUSTRIES, INC., Tokyo (JP)

( * ) Notice: Subject to any disclaimer, the term of this patent is extended or adjusted under 35 U.S.C. 154(b) by 244 days.

(21) Appl. No.: 17/914,015

(22) PCT Filed: Mar. 18, 2021

(86) PCT No.: PCT/JP2021/011083
§ 371 (c)(1),
(2) Date: Sep. 23, 2022

(87) PCT Pub. No.: WO2021/200215
PCT Pub. Date: Oct. 7, 2021

(65) Prior Publication Data
US 2023/0128336 A1   Apr. 27, 2023

(30) Foreign Application Priority Data

Mar. 30, 2020 (JP) ................................. 2020-059632

(51) Int. Cl.
| | |
|---|---|
| *H01M 4/88* | (2006.01) |
| *H01M 4/86* | (2006.01) |
| *H01M 4/96* | (2006.01) |
| *H01M 8/0234* | (2016.01) |
| *H01M 8/0239* | (2016.01) |
| *H01M 8/0243* | (2016.01) |
| *H01M 8/0245* | (2016.01) |

(52) U.S. Cl.
CPC ....... *H01M 4/8807* (2013.01); *H01M 4/8605* (2013.01); *H01M 4/8657* (2013.01); *H01M 4/8668* (2013.01); *H01M 4/96* (2013.01); *H01M 8/0234* (2013.01); *H01M 8/0239* (2013.01); *H01M 8/0243* (2013.01); *H01M 8/0245* (2013.01)

(58) Field of Classification Search
CPC ............. H01M 8/0234; H01M 8/0239; H01M 8/0243; H01M 8/0245
See application file for complete search history.

(56) References Cited

U.S. PATENT DOCUMENTS

| | | | |
|---|---|---|---|
| 2006/0180798 A1 | 8/2006 | Chida et al. | |
| 2015/0140470 A1* | 5/2015 | Razack | H01M 4/8807 |
| | | | 156/308.2 |
| 2018/0248197 A1* | 8/2018 | Hashimoto | H01M 4/96 |
| 2019/0020040 A1* | 1/2019 | Kato | H01M 4/86 |
| 2019/0027761 A1* | 1/2019 | Miyake | H01M 4/8605 |
| 2019/0044153 A1* | 2/2019 | Sode | H01M 4/8807 |
| 2019/0058199 A1* | 2/2019 | Utsunomiya | H01M 4/861 |

FOREIGN PATENT DOCUMENTS

| | | |
|---|---|---|
| JP | 2004-311431 A | 11/2004 |
| JP | 2018-152270 A | 9/2018 |

OTHER PUBLICATIONS

International Search Report, issued in PCT/JP2021/011083, PCT/ISA/210, dated May 18, 2021.
Written Opinion of the International Searching Authority, issued in PCT/JP2021/011083, PCT/ISA/237, dated May 18, 2021.

* cited by examiner

*Primary Examiner* — Kelly M Gambetta
(74) *Attorney, Agent, or Firm* — Birch, Stewart, Kolasch & Birch, LLP

(57) ABSTRACT

The objective of the present invention is to provide a method which is for producing a gas diffusion electrode substrate having a high conductivity and a chemical resistance, and by which an increase in production cost can be suppressed. The present invention is a method for producing a gas diffusion electrode substrate in which a microporous layer is formed in a conductive porous body formed by bonding carbon fibers to each other by means of a cured product of a binder resin, the method having, in the following order: a binder resin impregnation step in which a carbon fiber structure is impregnated with a binder resin composition to obtain a pre-impregnated body; a coating step in which the surface of the pre-impregnated body is coated with a microporous layer coating solution; and a heat treatment step in which the pre-impregnated body that has been subjected to the coating step is heat-treated at a temperature of at least 200° C., wherein the binder resin composition is a liquid composition including a binder resin and a carbon powder, the binder resin being a thermosetting resin, and the method does not have a step for heat-treating the pre-impregnated body at a temperature of at least 200° C., between the binder resin impregnation step and the heat treatment step.

10 Claims, No Drawings

METHOD FOR PRODUCING GAS DIFFUSION ELECTRODE SUBSTRATE

TECHNICAL FIELD

The present invention relates to a method for producing a gas diffusion electrode substrate that is suitably used for an electrode in a fuel cell, particularly in a solid polymer fuel cell.

BACKGROUND ART

In recent years, expectations for energy that does not emit carbon dioxide have increased due to global environmental concerns, and in particular, fuel cells that use hydrogen as a fuel have attracted attention. A fuel cell is a kind of power generator in which a fuel gas containing hydrogen is supplied to an anode and an oxidizing gas containing oxygen is supplied to a cathode to obtain an electromotive force by an electrochemical reaction occurring at both the electrodes.

Among fuel cells, solid polymer fuel cells are particularly versatile. A solid polymer fuel cell is generally configured by layering a separator, a gas diffusion electrode substrate, a catalyst layer, an electrolyte membrane, a catalyst layer, a gas diffusion electrode substrate, and a separator in this order. Specific examples of the gas diffusion electrode substrate to be used include electrically conductive porous bodies including carbon fibers, such as carbon felt, carbon paper, and carbon cloth.

The electrically conductive porous body is to have a spring property of absorbing a dimensional change of the electrolyte membrane in the thickness direction, and therefore the carbon fibers are often bound with a binder. As such a binder, resin carbides that can provide high electrical conductivity are widely used. However, in order to obtain a resin carbide, a step is to be performed in which after adding a resin, the porous body is heat-treated in an inert atmosphere at 1000° C. or higher.

In a gas diffusion electrode substrate as described above, the fibers are coarsely woven, so that condensation of water vapor generates large water droplets, the water droplets adhere to the electrode surface, and thus flooding easily occurs that hinders gas supply to the electrode. Therefore, a microporous layer (MPL) including electrically conductive fine particles such as a carbon powder is sometimes provided on the electrically conductive porous body. The MPL is generally formed by coating the surface of the electrically conductive porous body with a coating liquid in which a carbon powder, fluororesin particles as a binder of the carbon powder, and a surfactant are dispersed in water (hereinafter referred to as MPL coating liquid), and drying and sintering the coating liquid.

Therefore, preparation of a gas diffusion electrode substrate having an MPL usually needs heat treatment for firing a resin carbide and heat treatment for sintering an MPL coating liquid to form an MPL. However, such heat treatment needs a plurality of large-scale heating furnaces, and has a problem of large production cost.

Therefore, in Patent Document 1, an attempt is made to suppress the cost by mixing a carbon powder such as carbon black or graphite in a porous body and lowering the heat treatment temperature. In Patent Document 2, an attempt is made to ensure the electrical conductivity and the chemical resistance by making a porous body include split fibers having a fibril part, and to omit the heating step of generating a resin carbide.

PRIOR ART DOCUMENTS

Patent Documents

Patent Document 1: International Publication No. 2001/022509
Patent Document 2: Japanese Patent Laid-open Publication No. 2004-363018

SUMMARY OF THE INVENTION

Problems to be Solved by the Invention

In Patent Document 1, carbon fibers can be bound to each other by heat treatment at a relatively low temperature, but the heat treatment temperature of the porous body is preferably 400° C. or higher, and more preferably 450° C. or higher in order to enhance the chemical resistance of the binder, and if an MPL is heat-treated in this temperature range, the water repellent included in the MPL is thermally decomposed. Therefore, in the case of providing an MPL, heat treatment is to be performed twice finally, and the cost suppression is limited.

In Patent Document 2, the cost can be kept low because no heat treatment is included, but the electrical conductivity is so low that the performance of a fuel cell deteriorates.

An object of the present invention is to provide a method for producing a gas diffusion electrode substrate having high electrical conductivity and high chemical resistance while the production cost is suppressed.

Solutions to the Problems

The present invention to solve the above-described problems is a method for producing a gas diffusion electrode substrate in which a microporous layer is formed on an electrically conductive porous body obtained by binding carbon fibers to each other with a cured product of a binder resin, and the method includes, in order, a binder resin impregnation step of impregnating a carbon fiber structure with a binder resin composition to obtain a prepreg, a coating step of coating a surface of the prepreg with a microporous layer coating liquid, and a heat treatment step of heat-treating the prepreg after the coating step at a temperature of 200° C. or higher, wherein the binder resin composition is a liquid composition including a thermosetting resin and a carbon powder, and the method does not include a step of heat-treating the prepreg at a temperature of 200° C. or higher between the binder resin impregnation step and the heat treatment step.

Effects of the Invention

By using the method for producing a gas diffusion electrode substrate of the present invention, it is possible to obtain a gas diffusion electrode substrate excellent in the electrical conductivity and the chemical resistance while the production cost is suppressed.

EMBODIMENTS OF THE INVENTION

[Electrically Conductive Porous Body]

In the present invention, the term "gas diffusion electrode substrate" refers to a substrate obtained by forming carbon fibers into a carbon fiber structure having a certain shape such as a papermaking material (as described below, for example, a carbon fiber papermaking material in a state of being only bonded with an organic polymer such as polyvinyl alcohol), then impregnating the carbon fiber structure with a binder resin to form a prepreg, curing the binder resin to bind the carbon fibers to each other, and further forming a microporous layer on the surface.

The electrically conductive porous body in the present invention (hereinafter, sometimes simply referred to as "porous body") is a porous structure including carbon fibers that are bound to each other to have a sheet-like form. Examples of such a usable porous body include carbon fiber papermaking materials, carbon fiber woven fabrics, and carbon fiber nonwoven fabrics. Porous bodies having a gap or a crack generated between the binder resin cured product and the carbon fibers are also included as long as the carbon fibers are bound to each other.

The electrically conductive porous body is preferably a carbon fiber papermaking material because a carbon fiber papermaking material is excellent in the property of absorbing a dimensional change of an electrolyte membrane in the direction perpendicular to the surface of the electrolyte membrane, that is, the "spring property". Here, the term "carbon fiber papermaking material" refers to a sheet-like substrate in which carbon fibers are randomly dispersed in a two-dimensional plane.

The carbon fiber papermaking material can be produced with a wet papermaking method in which carbon fibers are dispersed in a liquid to produce a carbon fiber papermaking material, or a dry papermaking method in which carbon fibers are dispersed in the air to produce a carbon fiber papermaking material. The wet papermaking method is preferably used because of its excellent productivity. The carbon fiber papermaking material may be produced by mixing a carbon powder or organic fibers for papermaking in order to improve the electrical conductivity or the water removal performance of the gas diffusion electrode substrate. In addition, for the purpose of improving the shape retention property and the handleability, the carbon fiber papermaking material may be produced using an organic polymer such as polyvinyl alcohol, polyvinyl acetate, polyacrylonitrile, or cellulose as an adhesive.

Examples of the carbon fibers constituting the porous body include polyacrylonitrile (PAN)-based, pitch-based, and rayon-based carbon fibers. Among them, PAN-based carbon fibers and pitch-based carbon fibers are preferably used because of their excellent mechanical strength.

The carbon fibers constituting the porous body preferably have a mean diameter of monofilaments (hereinafter, referred to as "carbon fiber diameter") within the range of 3 to 20 µm, and more preferably within the range of 5 to 10 µm. If the carbon fiber diameter is 3 µm or more, and more preferably 5 µm or more, the pore diameter becomes large to improve the water removal performance, so that flooding is easily suppressed. If the carbon fiber diameter is 20 µm or less, and more preferably 10 µm or less, the thickness unevenness becomes small, so that the thickness of the porous body is easily controlled within the preferred range described below. Here, the carbon fiber diameter can be determined by taking a photograph of the carbon fibers with a microscope such as a scanning electron microscope at a magnification of 1000 times, selecting 30 different monofilaments randomly, measuring their diameters, and calculating the average of the diameters.

The carbon fibers constituting the porous body preferably have a mean length of monofilaments (hereinafter, referred to as "carbon fiber length") within the range of 3 to 20 mm, and more preferably within the range of 5 to 15 mm. If the carbon fiber length is 3 mm or more, and more preferably 5 mm or more, the porous body tends to be excellent in the mechanical strength, the electrical conductivity, and the thermal conductivity. If the carbon fiber length is 20 mm or less, and more preferably 15 mm or less, the dispersibility of the carbon fibers becomes excellent, so that a uniform porous body can be easily obtained. A carbon fiber having the above-described carbon fiber length can be obtained, for example, with a method in which a continuous carbon fiber is cut into a desired length. The carbon fiber length is determined by taking a photograph of the carbon fibers with a microscope such as a scanning electron microscope at a magnification of 50 times, selecting 30 different monofilaments randomly, measuring their lengths, and calculating the average of the lengths.

[Binder Resin Impregnation Step]

The method for producing a gas diffusion electrode substrate of the present invention includes a binder resin impregnation step of impregnating a carbon fiber structure as described above with a binder resin composition to obtain a prepreg. In the present invention, the binder resin composition is a liquid composition including a thermosetting resin and a carbon powder.

Examples of the thermosetting resin to be used include phenolic resins, epoxy resins, melamine resins, and furan resins. A mixture of such a thermosetting resin with a thermoplastic resin is also preferably used.

As the carbon powder, graphite such as scaly graphite, scale-like graphite, amorphous graphite, artificial graphite, expanded graphite, or flaky graphite can be used. In addition, a nanocarbon material can be particularly preferably used, and examples of the nanocarbon material include carbon black such as furnace black, acetylene black, lamp black, and thermal black, carbon nanotubes, and carbon nanofibers. A small amount of nanocarbon material easily forms an electrically conductive path, and the amount of a nanocarbon material to be added to obtain the effect of reducing the electrically conductive resistance is smaller than that of graphite having a large particle size.

As the binder resin composition, a liquid composition is preferably used in which the binder resin and the carbon powder are dispersed in a solvent. When the binder resin and the carbon powder are dispersed in a solvent, the binder resin and the carbon powder are added to the solvent, and then strong shearing is applied. Thus, the dispersibility of the carbon powder is improved, and the carbon powder can be uniformly attached to the carbon fiber structure. Examples of the method of applying strong shearing include a method in which a homogenizer is used for stirring for 10 minutes or more at a rotation speed of 3000 r.p.m or more.

Examples of the method of impregnating the carbon fiber structure with the binder resin composition include a method in which the carbon fiber structure is immersed in a liquid binder resin composition obtained by adding a solvent to a carbon powder and a binder resin, and a method in which the binder resin composition is applied to the carbon fiber structure. Among them, the method in which the carbon fiber structure is immersed in a liquid binder resin composition is particularly preferably used because of its excellent productivity.

In impregnation of the carbon fiber structure with the binder resin composition, the carbon fiber structure is preferably impregnated with the binder resin composition so that the amount of the binder resin is 10 to 400 parts by mass, and more preferably 20 to 300 parts by mass based on 100 parts by mass of carbon fibers in the prepreg. If the amount of the binder resin is 10 parts by mass or more, and more preferably 20 parts by mass or more based on 100 parts by mass of the carbon fibers in the prepreg, a sufficient amount of the carbon powder can be attached to the porous body to obtain high electrical conductivity while the porous body includes an uncarbonized resin. If the amount of the binder resin is 400 parts by mass or less, and more preferably 300 parts by mass or less based on 100 parts by mass of the carbon fibers in the prepreg, the porous body has excellent gas diffusivity while maintaining the electrical conductivity.

In a case where graphite is used as the carbon powder, the graphite and the binder resin in the binder resin composition are preferably mixed so that the amount of the graphite is 150 to 400 parts by mass, and more preferably 170 to 350 parts by mass based on 100 parts by mass of the binder resin.

If the prepreg includes 150 parts by mass or more, and more preferably 170 parts by mass or more of the graphite based on 100 parts by mass of the binder resin, a porous body can be obtained that has excellent electrical conductivity and has also excellent chemical resistance because the binder resin is covered with the graphite. If the amount of the graphite is 400 parts by mass or less, and more preferably 350 parts by mass or less, the graphite is uniformly attached to the carbon fiber structure during the impregnation to obtain a porous body having excellent gas diffusivity. The chemical resistance indicates that even in repeated power generation, deterioration of binder performance due to oxidation deterioration of a resin and deterioration of electrical conductivity rarely occur.

In particular in the case of using a nanocarbon material as the carbon powder, the nanocarbon material and the binder resin in the binder resin composition are preferably mixed so that the amount of the nanocarbon material is 30 to 200 parts by mass, and more preferably 50 to 100 parts by mass based on 100 parts by mass of the binder resin because excellent electrical conductivity can be obtained with a small amount of the nanocarbon material as compared with the case of using ordinary graphite.

If the amount of the nanocarbon material is 30 parts by mass or more, and more preferably 50 parts by mass or more based on 100 parts by mass of the binder resin, a porous body having both electrical conductivity and chemical resistance can be obtained. If the amount of the nanocarbon material is 200 parts by mass or less, and more preferably 100 parts by mass or less based on 100 parts by mass of the binder resin, the nanocarbon material is uniformly attached to the carbon fiber structure during the impregnation to obtain a porous body having excellent gas diffusivity.

The porous body preferably has a thickness of 50 to 230 μm, and more preferably 70 to 180 μm. If the thickness of the porous body is 230 μm or less, and more preferably 180 μm or less, the gas diffusivity is easily enhanced, and generated water is easily discharged. Furthermore, the size of a fuel cell as a whole is easily reduced. If the thickness of the porous body is 50 μm or more, and more preferably 70 μm or more, gas diffusion in an in-plane direction in the porous body is efficiently performed, and power generation performance is easily improved. The thickness of the porous body is determined with the following method. The porous body is placed on a smooth surface plate, and a difference in height between the case of presence of the measurement object and the case of absence of the measurement object is measured under a pressure of 0.15 MPa. Samples are taken at 10 different parts, measured values of the difference in height are averaged, and the average thus obtained is defined as a thickness.

[Water Repellent Addition Step]

The method for producing a gas diffusion electrode substrate of the present invention may include a water repellent addition step of adding a water repellent including a fluororesin to the prepreg before the coating step described below. As the fluororesin included in the water repellent, one or more resins can be used that are selected from polytetrafluoroethylene (PTFE), tetrafluoroethylene-hexafluoropropylene copolymers (FEPs), perfluoroalkoxy fluororesins (PFAs), ethylene-tetrafluoroethylene copolymers (ETFEs), polyvinylidene fluoride (PVDF), and polyvinyl fluoride (PVF). Among them, PTFE and FEPs, which exhibit strong water repellency, are preferable. In the case of adding a water repellent including a fluororesin to the prepreg, the amount of the fluororesin included in the prepreg is not particularly limited, but is appropriately about 1% by mass or more and 10% by mass or less based on the total mass of the prepreg. If the amount of the fluororesin is 1% by mass or more, sufficient water repellency is exhibited, and if the amount is 10% by mass or less, pores that form a gas diffusion path or a drainage path can be easily secured while the water repellency is exhibited.

In the case of adding the water repellent as described above, water repellency treatment is performed using a water repellency treatment liquid in which the water repellent including a fluororesin is dispersed. Examples of the method of the water repellency treatment include a method in which the prepreg is immersed in the water repellency treatment liquid and a method in which the prepreg is coated with the water repellency treatment liquid by die coating or the like. The method in which the prepreg is immersed in the water repellency treatment liquid is preferable from the viewpoint of distributing the fluororesin uniformly also in the direction perpendicular to the in-plane direction in the porous body. After the water repellency treatment, a step of heating and drying may be performed, but even in such a case in the present invention, heat treatment at a temperature of 200° C. or higher is not performed as described below.

[Coating Step]

The method for producing a gas diffusion electrode substrate of the present invention subsequently includes a coating step of coating the surface of the obtained prepreg with an MPL coating liquid. As described above, the MPL coating liquid is a coating liquid in which a carbon powder, a water repellent, and, if necessary, a dispersion aid such as a surfactant are dispersed in water.

Examples of the carbon powder included in the MPL coating liquid include graphite such as scaly graphite, scale-like graphite, amorphous graphite, artificial graphite, expanded graphite, and flaky graphite, carbon black such as furnace black, acetylene black, lamp black, and thermal black, carbon nanotubes, and carbon nanofibers, and among them, carbon black is preferably used.

As the water repellent included in the MPL coating liquid, a fluororesin such as polytetrafluoroethylene (PTFE), a tetrafluoroethylene-hexafluoropropylene copolymer (FEP), or a tetrafluoroethylene-perfluoroalkyl vinyl ether copolymer (PFA) is preferably used.

As the dispersion aid, a nonionic surfactant is preferably used.

The surface of the prepreg can be coated with the MPL coating liquid using a coating system such as screen printing, rotary screen printing, spraying, intaglio printing, gravure printing, die coating, bar coating, or blade coating.

[Heat Treatment Step]

The production method of the present invention further includes a heat treatment step of heat-treating the prepreg coated with the MPL coating liquid after the coating step at a temperature of 200° C. or higher. By heating at a temperature of 200° C. or higher, the water repellent included in the MPL coating liquid is melted, and the MPL coating liquid is sintered and changed to an MPL. The heating temperature in the heat treatment step is preferably 200 to 400° C., and more preferably 300 to 400° C.

The MPL after the heat treatment step is usually a porous layer having an average pore diameter of 0.01 μm to 1 μm. The basis weight of the MPL is not particularly limited, but is preferably within the range of 5 to 50 g/m², and more preferably 10 to 30 g/m² after the heat treatment. If the basis weight of the MPL is 5 g/m² or more, and more preferably 10 g/m² or more, one surface of the porous body can be covered with the MPL, and back-diffusion of generated water is further promoted, so that drying of the electrolyte membrane can be further suppressed. If the basis weight of the MPL is 50 g/m² or less, and more preferably 30 g/m² or less, the water removal performance is further improved, so that flooding can be further suppressed.

[Drying Step]

If necessary, a drying step of drying the prepreg after the coating step at a temperature of 80 to 180° C. may be provided before the heat treatment step in order to volatilize water in the MPL coating liquid.

However, the production method of the present invention does not include a step of heat-treating the prepreg substantially at a temperature of 200° C. or higher between the binder resin impregnation step and the heat treatment step. In an ordinary method for producing a gas diffusion electrode substrate, a step of heat-treating the prepreg at 1000° C. or higher in an inert atmosphere before coating with the MPL coating liquid to carbonize the binder resin is provided in order to impart electrical conductivity and chemical resistance to the binder resin. In the production method of the present invention, heat treatment step before coating with the MPL coating liquid is omitted, and therefore the binder resin having no electrical conductivity remains in the porous body. However, a certain amount of the carbon powder having high electrical conductivity is included as the binder resin composition, and thus electrical conductivity and chemical resistance can be secured even with one heat treatment after coating with the MPL coating liquid.

EXAMPLES

<Evaluation of Electrically Conductive Resistance>

The gas diffusion electrode substrate was cut into 30 mm×30 mm and sandwiched between two gold-plated plates, a uniform surface pressure of 1.0 MPa and a current of 1.0 A were applied to the resulting product, the electrical resistance at this time was measured, and the measured value was multiplied by the area of the substrate to determine the electrically conductive resistance in the direction perpendicular to the surface of the gas diffusion electrode substrate.

<Evaluation of Power Generation Performance of Solid Polymer Fuel Cell>

A catalyst liquid was prepared by sequentially adding 1.00 g of platinum carrying carbon (manufactured by TANAKA Kikinzoku Kogyo K. K., platinum carrying amount: 50% by mass), 1.00 g of purified water, 8.00 g of "Nafion" (registered trademark) solution (manufactured by Aldrich, "Nafion" (registered trademark), 5.0% by mass), and 18.00 g of isopropyl alcohol (manufactured by NACALAI TESQUE, INC.).

Next, a "NAFLON" (registered trademark) PTFE tape "TOMBO" (registered trademark) No. 9001 (manufactured by NICHIAS Corporation) cut into 5 cm×5 cm was sprayed with the catalyst liquid and dried at normal temperature to prepare a PTFE sheet with a catalyst layer having a platinum amount of 0.3 mg/cm². Subsequently, a solid polymer electrolyte membrane "Nafion" (registered trademark) NRE-211CS (manufactured by DuPont) cut into 8 cm×8 cm was sandwiched between two PTFE sheets with a catalyst layer, the resulting product was pressed at a temperature of 130° C. for 5 minutes while pressurized at 5 MPa with a flat press machine, and thus the catalyst layers were transferred onto the solid polymer electrolyte membrane. After the pressing, the PTFE sheets were removed to prepare a solid polymer electrolyte membrane with catalyst layers.

Next, the solid polymer electrolyte membrane with catalyst layers was sandwiched between two gas diffusion electrode substrates cut into 5 cm×5 cm, the resulting product was pressed at a temperature of 130° C. for 5 minutes while pressurized at 3 MPa with a flat press machine, and thus a membrane electrode assembly was prepared. It is noted here that the gas diffusion electrode substrate was disposed so that the surface having the microporous layer was in contact with the catalyst layer.

The obtained membrane electrode assembly was incorporated into a unit cell for fuel cell evaluation, the current density was changed, and the voltage at this time was measured. Here, the separator used was a serpentine-type separator having one flow channel of 1.0 mm in each of channel width, channel depth, and rib width. Furthermore, non-pressurized hydrogen was supplied to the anode side, and non-pressurized air was supplied to the cathode side for evaluation.

Both the hydrogen and the air were humidified using a humidification pot whose temperature was set to 70° C. The humidity at this time was 100%. The utilization rates of the hydrogen and oxygen in the air were set to 70 mol % and 40 mol %, respectively, and the temperature of the cell was set to 70° C. The output voltage at a current density of 1.5 A/cm² was measured, and used as an index of the power generation performance.

Example 1

Polyacrylonitrile-based carbon fibers manufactured by Toray Industries, Inc. were cut into a length of 12 mm, dispersed in water for papermaking, further immersed in a 10% by mass aqueous dispersion of polyvinyl alcohol, and dried to obtain a long carbon fiber papermaking material (carbon fiber structure) having a carbon fiber basis weight of about 20 g/m², and the carbon fiber papermaking material was wound up into a roll.

A dispersion liquid (binder resin composition) was prepared by mixing a phenolic resin, scaly graphite (average particle size: 5 μm), and methanol at a mass ratio of 2:7:91. The carbon fiber structure cut into 10 cm×10 cm was immersed in the dispersion, pulled up, and then squeezed with a mangle to remove the excess liquid. Thereafter, the carbon fiber structure was dried at a temperature of 100° C. for 10 minutes to obtain a prepreg so that after the drying, 50 parts by mass of the phenolic resin was attached based on 100 parts by mass of the carbon fibers, and 350 parts by mass of the scaly graphite was attached based on 100 parts by mass of the phenolic resin.

Next, the prepreg was heated and pressurized at 180° C. for 5 minutes while pressurized with a flat press machine. In the pressurizing, a spacer was disposed in the flat press machine to adjust the space between the upper and lower press plates so that the heat-treated prepreg had a thickness of 130 μm. Thereafter, the prepreg was immersed in an aqueous dispersion of a PTFE resin ("POLYFLON" (registered trademark) PTFE dispersion D-210C (manufactured by Daikin Industries, Ltd.)) to impregnate the prepreg with a fluororesin. After the prepreg was immersed in the PTFE aqueous dispersion, the prepreg was pulled up and dried, and thus 5 parts by mass of PTFE was attached to 100 parts by mass of the prepreg.

Finally, one surface of the prepreg after the water repellency treatment was coated with an MPL coating liquid containing carbon black, PTFE, and "TRITON" (registered trademark) X-100 (manufactured by NACALAI TESQUE, INC.) as a surfactant at a mass ratio of 3:1:6, and the resulting product was heat-treated at 380° C. for 10 minutes to obtain a gas diffusion electrode substrate with about 20 g/m$^2$ of a microporous layer.

Example 2

A gas diffusion electrode substrate was obtained in the same manner as in Example 1 except that the carbon fiber structure was immersed in a binder resin composition obtained by mixing a phenolic resin, scaly graphite, and methanol at a mass ratio of 2:3:95, and impregnated so that the amount of the phenolic resin was 50 parts by mass based on 100 parts by mass of the carbon fibers and the amount of the scaly graphite was 154 parts by mass based on 100 parts by mass of the phenolic resin.

Example 3

A gas diffusion electrode substrate was obtained in the same manner as in Example 1 except that acetylene black "DENKA BLACK" (registered trademark) (manufactured by Denka Company Limited) was used instead of scaly graphite, and the carbon fiber structure was immersed in a binder resin composition obtained by mixing a phenolic resin, acetylene black, and methanol at a mass ratio of 2:2:96, and impregnated so that the amount of the phenolic resin was 50 parts by mass based on 100 parts by mass of the carbon fibers and the amount of the acetylene black was 83 parts by mass based on 100 parts by mass of the phenolic resin.

Example 4

A gas diffusion electrode substrate was obtained in the same manner as in Example 1 except that furnace black "KETJENBLACK" (registered trademark) (manufactured by LION SPECIALTY CHEMICALS CO., LTD.) was used instead of scaly graphite, and the carbon fiber structure was immersed in a binder resin composition obtained by mixing a phenolic resin, furnace black, and methanol at a mass ratio of 2:2:96, and impregnated so that the amount of the phenolic resin was 50 parts by mass based on 100 parts by mass of the carbon fibers and the amount of the furnace black was 83 parts by mass based on 100 parts by mass of the phenolic resin.

Example 5

A gas diffusion electrode substrate was obtained in the same manner as in Example 1 except that linear carbon vapor-grown carbon fibers (carbon nanotubes) "VGCF" (registered trademark) (manufactured by Showa Denko K. K.) was used instead of scaly graphite, and the carbon fiber structure was immersed in a binder resin composition obtained by mixing a phenolic resin, carbon nanotubes, and methanol at a mass ratio of 2:2:96, and impregnated so that the amount of the phenolic resin was 50 parts by mass based on 100 parts by mass of the carbon fibers and the amount of the carbon nanotubes was 83 parts by mass based on 100 parts by mass of the phenolic resin.

Example 6

A gas diffusion electrode substrate was obtained in the same manner as in Example 1 except that acetylene black "DENKA BLACK" (registered trademark) (manufactured by Denka Company Limited) was used instead of scaly graphite, and the carbon fiber structure was immersed in a binder resin composition obtained by mixing a phenolic resin, acetylene black, and methanol at a mass ratio of 3:1:96, and impregnated so that the amount of the phenolic resin was 50 parts by mass based on 100 parts by mass of the carbon fibers and the amount of the acetylene black was 36 parts by mass based on 100 parts by mass of the phenolic resin.

Comparative Example 1

A gas diffusion electrode substrate was obtained in the same manner as in Example 1 except that the carbon fiber structure was immersed in a binder resin composition obtained by mixing a phenolic resin and methanol at a mass ratio of 7:93, and impregnated so that the amount of the phenolic resin was 50 parts by mass based on 100 parts by mass of the carbon fibers.

Table 1 shows the evaluation results of the electrically conductive resistance and the power generation performance (output voltage) of the gas diffusion electrode substrate prepared in each of Examples and Comparative Examples.

TABLE 1

| | | Unit | Example 1 | Example 2 | Example 3 | Example 4 | Example 5 | Example 6 | Comparative Example 1 |
|---|---|---|---|---|---|---|---|---|---|
| Electrically conductive porous body | Carbon powder | — | Scaly graphite | Scaly graphite | Acetylene black | Furnace black | Carbon nanotubes | Acetylene black | — |
| | Amount of binder resin based on 100 parts by mass of carbon fibers | — | 50 parts by mass | 50 parts by mass | 50 parts by mass | 50 parts by mass | 50 parts by mass | 50 parts by mass | 50 parts by mass |
| | Amount of carbon powder based on 100 parts by mass of binder resin | — | 350 parts by mass | 154 parts by mass | 83 parts by mass | 83 parts by mass | 83 parts by mass | 36 parts by mass | — |
| Electrically conductive resistance | | mΩ · cm$^2$ | 47.1 | 51.6 | 23.8 | 18.2 | 12.8 | 37.8 | 156 |
| Power generation performance (output voltage) | | V | 0.52 | 0.50 | 0.57 | 0.59 | 0.61 | 0.54 | 0.21 |

The invention claimed is:

1. A method for producing a gas diffusion electrode substrate in which a microporous layer is formed on an electrically conductive porous body obtained by binding carbon fibers to each other with a cured product of a binder resin, the method comprising, in order:
 a binder resin impregnation step of impregnating a carbon fiber structure with a binder resin composition to obtain a prepreg;
 a coating step of coating a surface of the prepreg with a microporous layer coating liquid; and
 a heat treatment step of heat-treating the prepreg after the coating step at a temperature of 200° C. or higher,
 wherein the binder resin composition is a liquid composition including a binder resin and a carbon powder, and
 the binder resin is a thermosetting resin, and
 the method not comprising a step of heat-treating the prepreg at a temperature of 200° C. or higher between the binder resin impregnation step and the heat treatment step.

2. The method for producing a gas diffusion electrode substrate according to claim 1, wherein in the binder resin impregnation step, the carbon fiber structure is impregnated with the binder resin composition so that an amount of the binder resin is 10 to 400 parts by mass based on 100 parts by mass of carbon fibers in the prepreg.

3. The method for producing a gas diffusion electrode substrate according to claim 1, wherein the carbon fiber structure is a carbon fiber papermaking material.

4. The method for producing a gas diffusion electrode substrate according to claim 1, wherein the carbon powder is graphite.

5. The method for producing a gas diffusion electrode substrate according to claim 4, wherein in the binder resin composition, an amount of the graphite is 150 to 400 parts by mass based on 100 parts by mass of the binder resin.

6. The method for producing a gas diffusion electrode substrate according to claim 1, wherein the carbon powder is a nanocarbon material selected from carbon black, a carbon nanotube, or a carbon nanofiber.

7. The method for producing a gas diffusion electrode substrate according to claim 6, wherein in the binder resin composition, an amount of the nanocarbon material is 30 to 200 parts by mass based on 100 parts by mass of the binder resin.

8. The method for producing a gas diffusion electrode substrate according to claim 1, comprising a water repellent addition step of adding a water repellent including a fluororesin to the prepreg before the coating step.

9. The method for producing a gas diffusion electrode substrate according to claim 1, comprising a drying step of drying the prepreg after the coating step at a temperature of 80 to 180° C. before the heat treatment step.

10. The method for producing a gas diffusion electrode substrate according to claim 1, wherein the heat treatment temperature in the heat treatment step is 200 to 400° C.

* * * * *